United States Patent Office 3,422,500
Patented Jan. 21, 1969

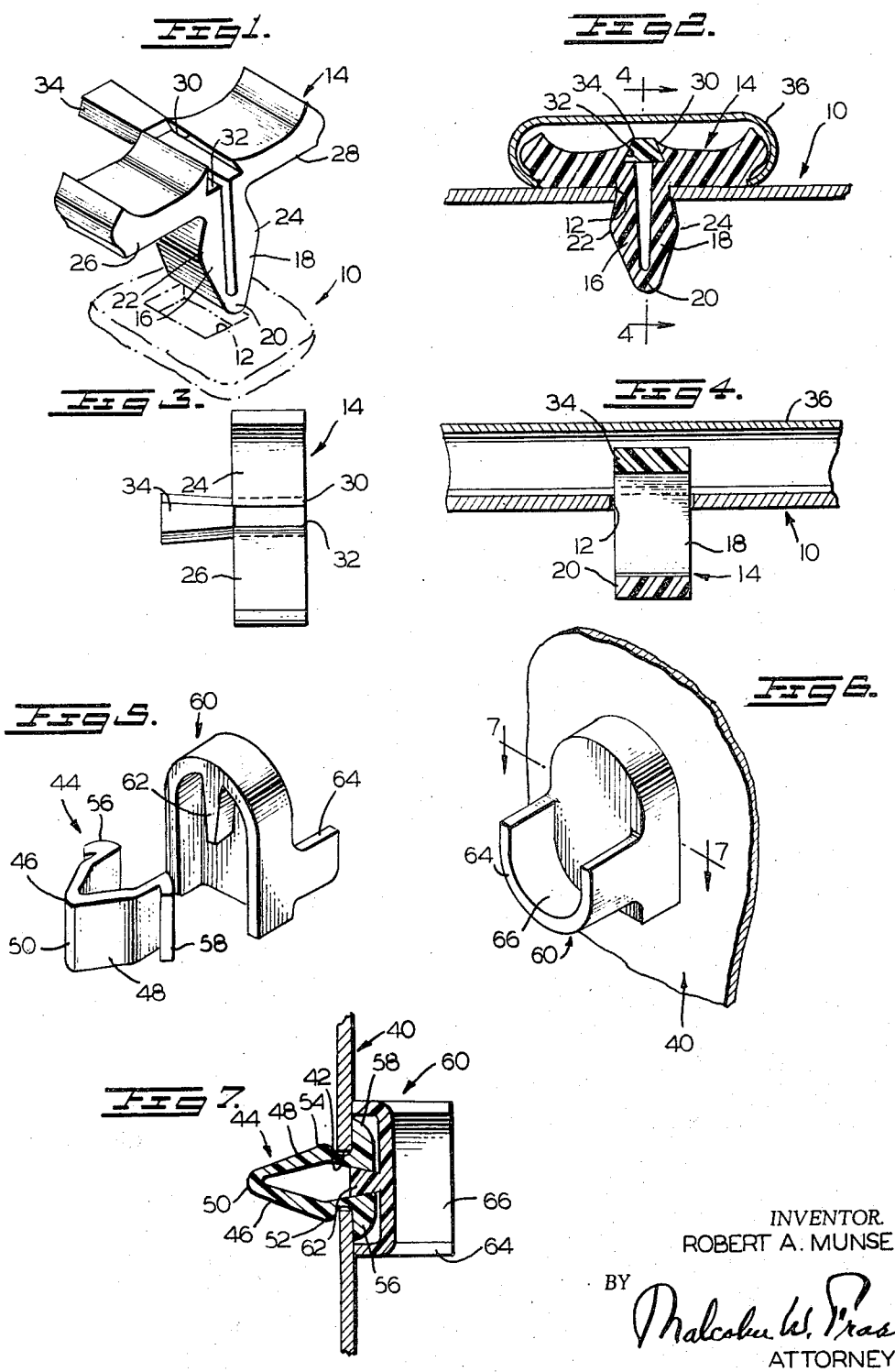

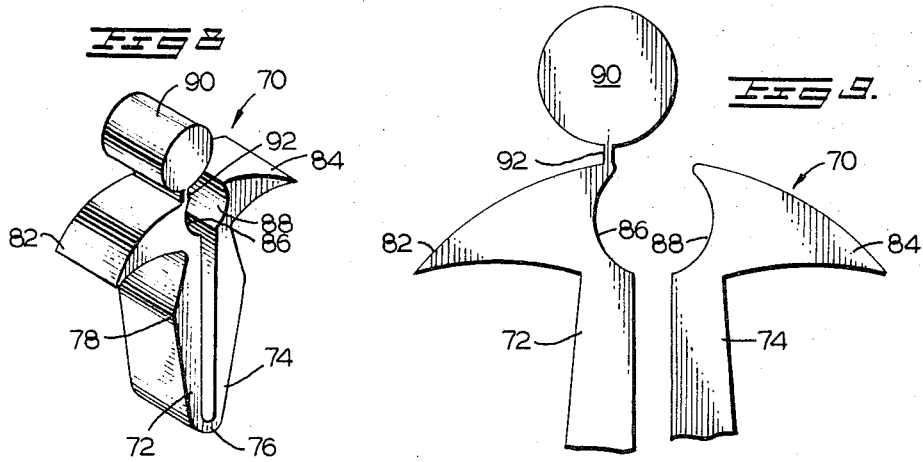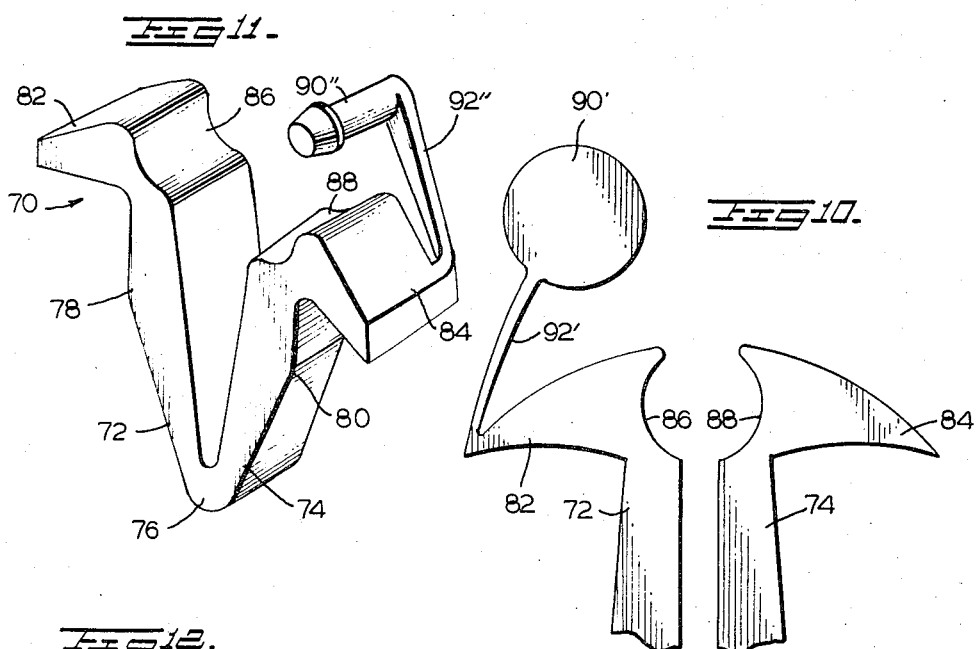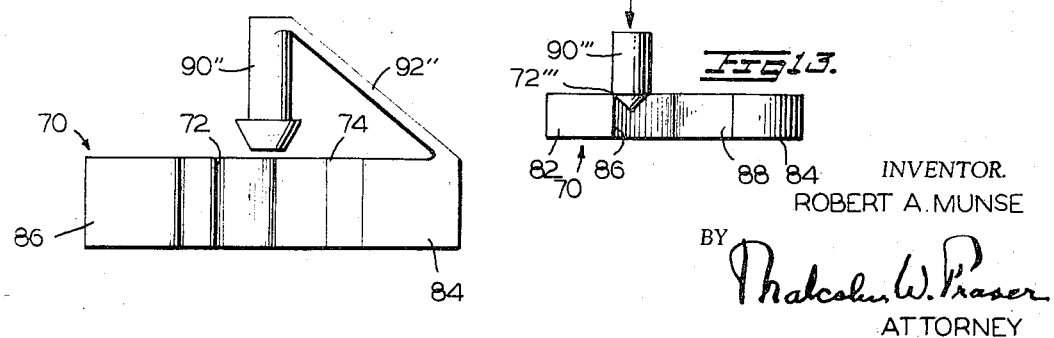

3,422,500
PLASTIC ANCHORING FASTENER
Robert A. Munse, Perrysburg, Ohio, assignor, by mesne assignments, to The Bishop and Babcock Corporation, Toledo, Ohio, a corporation of Ohio
Filed Jan. 14, 1963, Ser. No. 251,219
U.S. Cl. 24—73
Int. Cl. A44b 21/00; A47f 3/12; F25d 23/00
2 Claims

ABSTRACT OF THE DISCLOSURE

A molded plastic fastener for securing a molding strip to an apertured supporting panel. The fastener has a yieldable bifurcated shank portion engageable with the panel aperture and provided with aligned oppositely extending arm portions engageable with inturned edges of the molding. A laterally slidable wedge is driven in a direction normal to the longitudinal axis of the shank to force the outer edges of the shank into frictional engagement with the aperture and to force the arm portions into frictional engagement with the inturned edges of the molding.

---

The present invention relates to an anchoring fastener and, more particularly, to a molded plastic anchor member having a yieldable shank portion for application to an apertured supporting panel wherein wedge means are provided to be driven in a direction substantially normal to the axis of the shank portion to effectively lock the fastener on the apertured panel.

In many applications where it is desired to mount an object on a supporting panel, the space tolerances are restricted. Therefore, it is extremely difficult, and in certain instances impossible, to mount the object with the known anchoring fasteners of the type employing an axial type screw or locking means. Typical of the prior art fasteners of this type is the plastic anchoring fastener described in U.S. Patent 2,975,814, issued Mar. 21, 1961 wherein a screw-threaded stud is driven axially of the shank portion of the fastener to rigidify the shank portion in its contact with the defining edges of an associated fastener receiving aperture of a supporting panel. It will be appreciated that the driving tool for screw-threaded fasteners must extend substantially axially of or perpendicular to the supporting panel, thus necessitating space requirements at least equal to the length of the driving tool.

The fastener of the present invention obviates the space requirements and other disadvantages of the prior art and provides a fastener which may easily be used and reused many times.

The above and other objects of the invention will become readily apparent from the following detailed description of various embodiments of the invention when considered in connection with the attached drawings in which:

FIG. 1 is a perspective view of a one-piece anchoring fastener embodying the principles of the invention illustrated adjacent to an aperture in a supporting panel shown in fragmentary form, FIG. 2 is a sectional view taken through the fastener illustrated in FIG. 1 shown in a mounted position on the supporting panel with a molding strip mounted on the fastener, FIG. 3 is a top plan view of the fastener illustrated in FIG. 1, FIG. 4 is a sectional view taken along line 4—4 of the assembly illustrated in FIG. 2, FIG. 5 is an exploded perspective view of a modified fastener embodying the principles of the present invention, FIG. 6 is a perspective view of FIG. 5 shown in mounted position on a supporting panel, FIG. 7 is a sectional view taken along line 7—7 of the assembly illustrated in FIG. 6, FIG. 8 is a perspective view of a modified form of the anchoring fastener, FIG. 9 is a fragmentary side elevational view of the fastener illustrated in FIG. 8, FIG. 10 is a fragmentary side elevational view of a slightly modified form of the fastener illustrated in FIGS. 8 and 9, FIG. 11 is a perspective view of another modified form of the anchoring fastener, FIG. 12 is a top plan view of the anchoring fastener illustrated in FIG. 11, and FIG. 13 is a top plan view of a further slightly modified form of the anchoring fastener.

Referring to the drawings and, in particular, to FIGS. 1 to 4, there is shown a supporting panel generally indicated by reference numeral 10 having an aperture 12 for receiving a generally T-shaped fastener 14 formed of a resilient material. The fastener 14 includes a columnar portion formed of a pair of shank members 16 and 18 which are integrally connected at one end by a bridge portion 20. It will be noted that the shank members 16 and 18 are separated from one another to form a slot therebetween and extend, in their normal unflexed condition, in generally parallel relation. The shank members 16 and 18 are provided with complementary sections 22 and 24, respectively, of thickened or outwardly flared configuration.

At the other or root end portions of the shank members 16 and 18, there are provided outwardly extending arms 26 and 28, respectively. These arms extend outwardly in opposite directions generally perpendicular to the longitudinal axis of the columnar portion of the fastener. Each of the complementary inner edge portions of the root ends of the shank members 16 and 18 is provided with an inwardly extending transversely extending groove or shoulder 30 and 32, respectively. The shoulders 30 and 32 cooperate to form a channel for receiving a locking member in the form of a driving wedge pin 34. The pin 34 is preferably formed initially as an integral part of the fastener assembly connected thereto by a narrow junction, and positioned to be driven into the channel defined by the shoulders 30 and 32. In the preferred form of the fastener, the pin 34 flares outwardly from the end attached to the main body of the fastener to the opposite or free end thereof.

As a result of the above described structure, the fastener 14 may be employed to mount an element such as a molding strip 36, illustrated in FIGS. 2 and 4, to an automobile body, refrigerator, stove, or the like. Typically, the columnar portion of the fastener 14 is initially inserted into the aperture 12 in the supporting panel 10. The outward surfaces of the outwardly flared portions 22 and 24 of the shank members 16 and 18, respectively, effectively hold the fastener 14 onto the panel 10. In order to effect a tight or snug engagement between the anchoring fastener and the supporting panel, the pin 34 is driven inwardly until it is fully seated within the channel defined by the shoulders 30 and 32. It will be observed from FIG. 2 that when the driving pin 34 is driven into the channel, the shank members 16 and 18 are flexed outwardly away from one another. Manifestly, similar reesults could be achieved by forming the pin 34 of constant cross-sectional dimensions throughout and forming the shoulders 30 and 32 such that the resulting channel defined thereby tapers from one end to the other.

Finally, after the anchoring fastener is suitably fastened on the supporting panel, the molding strip 36 is latched into place with the inwardly turned outer marginal edges of the strip 36 against the respective stop faces of the outwardly extending arms and the outer surface of the supporting panel.

The anchoring fastener 14 is preferably molded from a plastic material of the a character which is typically selected from a group of materials including polyethylene, styrene, nylon, and the like. The shank portion of the fastener 14, as illustrated, is generally rectangular in cross-section; however, it will be understood it may be of other shapes somewhat dependent upon the configuration of the supporting panel aperture adapted to receive the fastener.

Referring now to FIGS. 5, 6 and 7, there is shown a modified form of the anchoring fastener which is useful as a work support. There is shown a supporting panel generally indicated by reference numeral 40 having an aperture 42 for receiving a substantially T-shaped fastener clip 44. The fastener 44 includes a columnar portion formed of a pair of shank members 46 and 48 which are integrally connected at one end by a bridge portion 50. The shank members 46 and 48 are separated from one another and are provided with complementary sections 52 and 54 of thickened or outwardly flared configuration.

At the opposite or root end of the shank members 46 and 48, there are provided outwardly extending arms 56 and 58, respectively. These arms extend outwardly in opposite directions generally perpendicular to the longitudinal axis of the columnar portion of the fastener.

The fastener clip 44 is adapted to receive a second part, generally indicated by reference numeral 60, which has a locking member or wedge key 62 formed as an integral part thereof. On the opposite side of the second part 60 is provided with a work supporting section 64. The work supporting section 64 is internally recessed to provide a compartment or chamber 66 partially enclosed by the wall of the section 64.

In use, the fastener clip 44 is introduced into the aperture 42 of the supporting panel 40 and, as it is inserted, shank members 46 and 48 are flexed toward one another until it assumes a fully inserted position. When fully inserted, the shank members 46 and 48 automatically spring outwardly engaging the associated marginal edge portions of the aperture 42, such that the edges are disposed substantially between the under surfaces of the arms 56 and 58 of the shank members and respective adjacent sections 52 and 54 of thickened or outwardly flared configuration. The resilience of the material of the fastener clip is sufficient to adequately maintain it on the supporting panel 40.

The locking member 62 of the second part 60 of the fastener assembly is now driven transversely of the axis of the columnar section of the fastener clip 44 into a channel-like opening defined between the inner opposing surfaces of the shank members at the root end thereof. As the locking member 62 enters the channel-like opening, the shank members are driven into firm engagement with the edges of the aperture 42 of the supporting panel. When the part 60 has been driven a sufficient amount, the fastener assembly is held securely on the panel. It will be appreciated that the above described fastener assembly could be used to advantage as a support for a rod forming part of a frame of a refrigerator shelf, as an example.

Of extreme importance in the structures described in connection with FIGS. 1 through 7 is the feature that while the fastener assemblies form excellent work supporting means, they can be removed from the supporting panel and replaced easily or be removed and reused.

FIGS. 8 and 9 illustrate a modified form of the anchoring fastener. More particularly, there is shown a one-piece molded fastener assembly formed of a resilient material. The fastener generally indicated by reference numeral 70 includes a columnar portion formed of a pair of shank members 72 and 74 integrally connected at one end by a bridge portion 76. The shank members 72 and 74 are separated from one another to form a slot therebetween and extend in their normal, unflexed condition, in generally parallel relation. The shank members 72 and 74 are provided with complementary sections 78 and 80, respectively, of thickened or outwardly flared configuration. As explained in connection with the earlier described figures, the sections 78 and 80 are effective to initially snap the fastener into an aperture in a supporting panel and hold the fastener in place until the associated locking member is inserted to securely fix the fastener in the panel.

At the other or root end portion of the columnar section of the fastener, there are provided outwardly extending arms 82 and 84. The arm 82 extends outwardly from the root end of the shank member 72; while the arm 84 extends outwardly, in the opposite direction, from the root end of the shank member 74. It will be appreciated that the arms 82 and 84 extend along an axis generally perpendicular to the longitudinal axis of the columnar portion of the fastener.

Each of the complementary inner edge portions of the root ends of the shank members 72 and 74 is provided with inwardly extending shoulders 86 and 88, respectively. The shoulders 86 and 88 cooperate to form a transverse channel for receiving a locking member in the form of a pin 90 which is connected to the fastener by a narrow junction 92.

In use, the pin 90 is removed from the fastener assembly by breaking or othewise severing the junction 92 and driven into the transverse channel defined by the shoulders or grooves 86 and 88, thus securely locking the fastener in an aperture in an associated supporting panel, not shown.

A modified form of the fastener illustrated in FIGS. 8 and 9 is shown in FIG. 10. The fastener is substantially the same as the FIG. 8 and 9 structure except a locking member 90' is secured to the main body of the fastener 70 by a larger junction 92'.

A further slightly modified form of the fastener illustrated in FIGS. 8 and 9 is shown in FIGS. 11 and 12. A locking member 90" is connected to the fastener 70 at the side of one of the outwardly extending arms; namely, arm 84, by a junction strip 92". In this embodiment of the invention, the locking member 90" may be driven into the transverse channel defined by the grooves 86 and 88 without first being actually severed from the body of the fastener 70. The junction strip 92" is flexible enough to enable the locking member 90" to be driven into the fastener without the necessary initial severing of the strip. This feature has the manifest advantage of eliminating the problem which might otherwise be caused by the loss of the locking member 90" either during the initial locking operation when the fastener is mounted on an associated supporting panel or during subsequent removals and reuses thereof.

Referring now to FIG. 13, there is illustrated another modified form of the invention wherein a locking member 90''' is connected to the side of the fastener 70 by a narrow junction 72''' and is positioned to be moved by an appropriate tool directly into the channel defined by the cooperating grooves 86 and 88. It will be appreciated that the junction 72''' must be broken by the movement of the locking member 90''' in the direction of the arrow which is in a direction which will dispose the locking member in an effective locking position when the fastener assembly is inserted in an aperture in a supporting panel.

Although there are a number of various types of plastic materials which may be used in fabricating the fasteners embodying the invention, plastics such as polyethylene, polyvinyl chloride and the like will produce satisfactory results.

It will be understood that the present invention has produced an anchoring fastener which can be applied to supporting panels wherein space allocations are at a minimum since the locking members thereof are designed for movement transverse to the columnar portion of the fastener which is inserted into the supporting panel aperture.

I claim:

1. A fastener for attaching a molding to an apertured support, comprising a pair of base portions each having substantially parallel inner and outer edges, said inner edges defining opposed longitudinal tracks and said outer edges having shoulder means adapted to snappingly engage portions of a hollow molding, said base portions being integrally connected by a resilient support-engaging stud, and a member capable of being slidably inserted between said base portions in flush engagement with said inner edges and being substantially coplanar with said base portions, said member having edges adapted to engage said longitudinal tracks to lock said fastener to a support.

2. A fastener as set forth in claim 1 wherein said member is integrally connected to at least one of said base portions by a frangible web portion.

References Cited

UNITED STATES PATENTS 2,540,396   2/1951   Krach _____ 24—73
2,659,950   11/1953   West _____ 24—73

FOREIGN PATENTS 1,222,697   1/1960   France.

DONALD A. GRIFFIN, *Primary Examiner.*

U.S. Cl. X.R.

312—116